June 23, 1931.   O. S. MARCKWORTH   1,811,725
ELECTRICAL DEVICE AND METHOD OF MAKING THE SAME
Filed Sept. 18, 1922
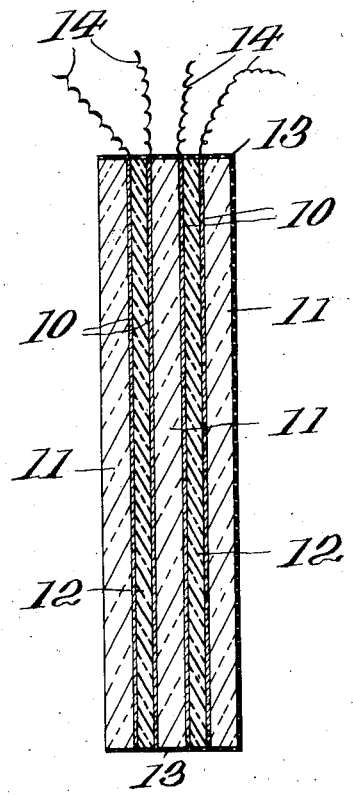

Patented June 23, 1931

1,811,725

UNITED STATES PATENT OFFICE

OTTO S. MARCKWORTH, OF COLUMBUS, OHIO

ELECTRICAL DEVICE AND METHOD OF MAKING THE SAME

Application filed September 18, 1922. Serial No. 588,922.

This invention is an electric device of composite structure, and method of making the same.

One of the objects of the invention is to so treat dielectric and conductive components, that they are welded and united by a permanent union, and hermetically sealed so as to prevent access of air, moisture or any other substance, to cause its deterioration or to interfere with its proper function. A further object is to provide a composite article for electrical purposes, in which the parts are so closely united that penetration of foreign substances is prevented, thereby avoiding leakage and assuring uniform results. A further object is to provide a device of the character mentioned which will be compact and rugged to stand rough handling and which will be protected against possible mechanical injury. A further object is to provide an electric condenser of small volume and maximum capacity.

The invention will be hereinafter fully set forth and particularly pointed out in the claims.

In the accompanying drawing, the figure is a sectional view illustrating diagrammatically, a device constructed in accordance with the invention.

To produce a device conforming to the invention, films of metal 10 are carefully and permanently deposited upon sheets 11 of dielectric material, so as to present a continuous contacting medium on each sheet. These metallic deposits may originally have been in the form of sheets, powders, solutions or any other form recognized in the arts, by which metal may be applied to surfaces. The films may or may not cover the entire area of the dielectric sheet, and may be deposited upon one or both sides as desired.

Any desired number of components each consisting of a dielectric sheet with the film or films of metal deposited thereon, may then be assembled as shown in the drawing, with welding sheets 12 of mica, bakelite, celluloid, rubber or any other suitable dielectric interposed between them to separate the metallic deposits 10. The assembled components and welding sheets are then subjected to such procedure as will weld said components together or unite them firmly. The edges of the completed unit thus provided, which may contain any number of components or individual elements, are then preferably further sealed with a dielectric substance 13, such as bakelite, varnish, pyroxylin lacquer, or other suitable medium. Of course where the device is to be used for electrical purposes, for instance, as a condenser, contacting leads 14 will have been placed in contact with the respective metallic deposits 10, and brought out of the unit in such manner that all or any part of the area of the conductive films may be connected at will.

As a specific example, thin sheets of glass 11, which have been silvered as indicated at 10, on either or both sides by any suitable or preferred process, are separated by thin sheets or films 12 of celluloid, the thickness depending upon the required dielectric strength. Before placing the sheets 12 in position they are moistened with a latent solvent of celluloid, such as a solution of camphor in fusel oil. When the desired number of components 10, 11, and interposed sheets 12 have been assembled, with conducting leads 14 (e. g. of very thin copper or brass foil), properly placed in contact with the silver and brought out at the side, or through openings otherwise located, the entire mass is placed under compression at such a temperature that the celluloid will become semi-plastic and adhesive and firmly weld the components together. For instance, fifty pounds per square inch pressure at 150° C., will effect the union of the individual elements into a single rugged unit of very great strength and high capacity.

The method by which the celluloid is treated by a retarded solvent and then manipulated to produce a laminated article, is more fully discussed in my Patent Number 1,421,974, issued July 4, 1922.

After the dielectric sheets with their attached films of metal have been permanently welded together, the edges of the completed unit are further sealed as before stated, with a dielectric substance.

One of the advantages of an article constructed as above described, especially when used as an electric condenser, is that close contact between the conductor and dielectric is secured, which contact is so intimate and permanent that neither air, other gases, moisture or any other substance can penetrate, even after a long period of exposure under pressure. A further advantage is that the parts are so closely united that penetration of foreign substances is prevented, and the intimate contact secured necessarily results in an increase of electrical capacity, prevents leakage, and assures uniform results. At the same time the metallic films are permanently protected against possible mechanical injury. The units are so compact and rugged in fact, that they will stand practically any amount of abuse. A further decided advantage is that of a greater capacity per unit of area than has heretofore been possible.

Having thus explained the nature of the invention and described an operative manner of constructing and using the same, although without attempting to set forth all of the forms in which it may be made, or all of the forms of its use, what is claimed is:—

1. The method of constructing a composite article comprising first producing components for said article by applying a permanent conductive surface coating to each one of a plurality of sheets of dielectric material, moistening binder sheets with a solvent which is normally incapable of attacking the binder sheet, so that the condition of said binder sheet remains unchanged during the application of the solvent, interposing the moistened binder sheets between and in contact with the coated surfaces of two or more of said components, and finally causing said solvent to become sufficiently active to soften the moistened portions of said binder sheets so as to cause the moistened surfaces to unite with contiguous coated surfaces of other components.

2. The method of constructing a composite article comprising first producing components for said article by applying a permanent conductive surface coating to each one of a plurality of sheets of dielectric material, moistening binder sheets with a solvent which is normally incapable of attacking the binder sheet, so that the condition of said binder sheet remains unchanged during the application of the solvent, interposing the moistened binder sheets between and in contact with the coated surfaces of two or more of said components, applying pressure to cause said solvent to become sufficiently active to soften the moistened portions of the binder sheet and also to cause said moistened surfaces to unite said components, and finally hermetically sealing the edges of the united components and said binder sheets.

3. The method of constructing a composite article comprising first producing components for said article by applying a permanent metallic surface coating to each one of a plurality of sheets of dielectric material, moistening binder sheets with a solvent which is normally incapable of attacking the binder sheet so that the condition of the binder sheet remains unchanged during the application of the solvent, placing conductor leads in contact with the metallic coated surfaces of said components, interposing the binder sheets between and in contact with the coated surfaces of two or more components and also in engagement with the inner ends of the respective conductor leads, and finally causing said solvent to become sufficiently active to soften the moistened portions of said binder sheets so as to cause said moistened surfaces to unite with contiguous coated surfaces of said components and to also anchor the inner ends of said conductor leads.

4. An electric device of the character described comprising a plurality of components each consisting of a flat dielectric body provided with a permanent coating of conductive material coextensive with the areas of the side faces thereof, conductor leads contacting with the respective conducting surfaces, and sheets of flat dielectric binding material interposed between contiguous coated surfaces of adjacent components, said sheets of binding material having partially dissolved surfaces which adhere to said coated surfaces so as to permanently unite the components and also anchor said conductor leads.

5. An electric device of the character described comprising a plurality of components, each consisting of a flat dielectric body provided with a permanent coating of conductive material coextensive with the areas of the side faces thereof, and sheets of flat celluloid interposed between contiguous coated surfaces of adjacent components, said sheets of celluloid having partially dissolved surfaces which adhere to said coated surfaces, so as to permanently unite said components.

In testimony whereof I have hereunto set my hand.

OTTO S. MARCKWORTH.